United States Patent
Malumyan

(10) Patent No.: US 8,316,837 B2
(45) Date of Patent: *Nov. 27, 2012

(54) PORTABLE COMBINATION GAS AND CHARCOAL BARBECUE GRILL

(76) Inventor: Karo Malumyan, Reseda, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 12/606,743

(22) Filed: Oct. 27, 2009

(65) Prior Publication Data

US 2011/0094494 A1    Apr. 28, 2011

Related U.S. Application Data

(63) Continuation-in-part of application No. 12/606,696, filed on Oct. 27, 2009.

(51) Int. Cl.
*F24B 3/00* (2006.01)
*F24C 5/001* (2006.01)

(52) U.S. Cl. ......... 126/25 R; 126/25 B; 126/30; 126/38; 126/50; 99/449; 99/450; 280/645; 280/651; 280/652; 248/188

(58) Field of Classification Search .............. 126/25 R, 126/25 B, 30, 38, 50; 280/646, 651, 652; 248/188; 99/449, 450
See application file for complete search history.

(56) References Cited

U.S. PATENT DOCUMENTS

| | | | |
|---|---|---|---|
| 1,608,924 A * | 11/1926 | Brown | 108/118 |
| 3,556,076 A * | 1/1971 | Stewart | 126/9 R |
| 4,884,499 A * | 12/1989 | Rensch et al. | 99/449 |
| 5,845,924 A * | 12/1998 | Huang | 280/642 |
| 6,311,708 B1 * | 11/2001 | Howle | 135/67 |
| 6,422,230 B1 * | 7/2002 | Stewart et al. | 126/25 R |
| 7,328,696 B2 * | 2/2008 | Rodriguez | 126/50 |
| 2004/0182381 A1 * | 9/2004 | Yeh | 126/25 R |
| 2008/0314376 A1 * | 12/2008 | Chung | 126/25 R |

* cited by examiner

*Primary Examiner* — Steven B McAllister
*Assistant Examiner* — Nikhil Mashruwala

(57) ABSTRACT

A gas grill base is pivotally attached at a first end to a folding stand with three pivoting U-shaped supports and a center pivot. Two of the supports rest on the ground on casters or wheels. The third support slides and locks within L-shaped slots below the second end of the gas grill base held horizontally for cooking. Alternately built-in gas jets or an inserted charcoal tray are used to cook. The supports pivot together and stand vertically on the castors. The gas grill base pivots down parallel to the supports so that all are vertical for storage and transport.

4 Claims, 3 Drawing Sheets

PORTABLE COMBINATION GAS AND CHARCOAL BARBECUE GRILL

CROSS-REFERENCE TO RELATED APPLICATIONS

The present utility patent application is a continuation-in-part of patent application Ser. No. 12/606/696 filed Oct. 27, 2009.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to a portable combination gas and charcoal barbecue grill comprising a gas grill and a removable charcoal tray, the gas grill being pivotally attached at one end to a folding stand having three pivoting U-shaped supports and a central pivot; two of the supports resting on the ground on casters or wheels and the third support sliding and locking within L-shaped slots below the second end of the gas grill base held horizontally for cooking, alternately using built-in gas jets or an inserted charcoal tray for cooking, and when finished pivoting the supports together standing vertically on the castors with the gas grill base pivoting down parallel to the supports so that all are vertical for storage and transport.

2. Description of Related Art Including Information Disclosed Under 37 CFR 1.97 and 1.98

Grilling is a method of cooking which enhances the flavor of food. Backyard barbecue grills have become very popular and can be found in many households. Originally, back-yard barbecue grills used charcoal or charcoal briquettes as fuel, and later gas barbeque grills were developed. Prior art patents fail to provide a combination gas and charcoal grill with a multi-positional stand and lockable top on the gas grill and an insertable charcoal grill which stores and transports inside the gas grill.

U.S. Pat. No. 6,640,800, issued Nov. 4, 2003 to Hodgson, claims a multiple fuel cooking apparatus. The cooking apparatus includes a body member comprising a perimeter wall. The perimeter wall defines an interior space of the body member. The interior space of the body member comprises an open end for permitting at least one heat source to be inserted into the interior space of the body member. A grill member is selectively coupled to the body member whereby the grill member is positioned over the interior space of the body member for supporting food to be cooked by the heat source positioned in the interior space. An oven assembly is selectively coupled to the body member. The oven assembly is positioned over the interior space of the body member for receiving food to be baked by the heat source positioned in the interior space of the body member.

U.S. Pat. No. 5,070,857, issued Dec. 10, 1991 to Sarten, shows a convertible food preparation/holding apparatus which includes an open bottom cabinet supported on legs above the ground. The cabinet is adapted to selectively receive a charcoal pan for charcoal firing and a gas burner assembly for gas firing. The apparatus also includes a hot/cold serving assembly that may be positioned in the cabinet to convert the apparatus to a hot or cold serving table. The cabinet is provided with a series of cooperating F-shaped slots in opposing sidewalls that allow the desired positioning of the charcoal pan in various cooking positions. The lower edge of the cabinet also includes an inwardly directed flange about its entire periphery. When the charcoal pan is moved to its lowermost position the pan rests on this flange cutting off air flow from beneath the cabinet.

U.S. Patent Application #20040000303, published Jan. 1, 2004 by Regen, indicates a collapsible multi-level barbeque grill, oven and smoker cooking system for outdoor cooking has a body for enclosing items to be cooked, and one or both of a charcoal pan and a gas burner for providing heat for cooking. The system is characterized in that the body is formed of a plurality of ring segments of sequentially smaller size, arranged such that the body may be collapsed telescopically to form a cooking chamber of a first height, or extended from the collapsed state to form a cooking chamber of a second, substantially greater height.

U.S. Pat. No. 6,173,644, issued Jan. 16, 2001 to Krall, is for an apparatus for converting a gas grill into a charcoal burning grill for conveniently using charcoal or other flammable material in a gas grill. The apparatus for converting a gas grill into a charcoal burning grill includes an adapter container for holding flammable material. The adapter container is removably positionable in the interior of the housing. The screen is removable from the housing. The adapter container is positionable on the heating system within the housing of a gas grill. The flammable material is placed in the container and ignited. The screen is replaced such that the screen covers the adapter container.

U.S. Pat. No. 6,523,461, issued Feb. 25, 2003 to Johnston, provides a charcoal tray and cooking rack for dual fuel barbeque grill configured to permit the use of charcoal for cooking in a gas barbecue grill, the gas grill having a bottom casting containing a gas burner element, a cooking rack supported thereabove, and a top casting rotatably affixed thereto. The apparatus includes a tray configured to be received within the bottom casting and the tray includes a pair of handles. Each of the handles includes a proximal end and a distal end, and the handles are rotatably connected to the tray at the proximal ends and the distal ends are configured to support the cooking rack.

U.S. Pat. No. 6,161,534, issued Dec. 19, 2000 to Kronman, shows a method and apparatus for converting a gas grill and/or charcoal burning grill. Backyard type gas grills are made suitable for use with solid fuels such as charcoal by removing existing passive radiant heat material such as lava rocks and inserting an apparatus comprising supports and perforated fuel basket. The unique design of the invention allows for its implementation in a majority of gas grills on the market by permitting the supports, which rest on at least a gas burner, to be positioned and fastened to the fuel basket anywhere and in various directions with respect to the fuel basket. Locking means prevent separation of the supports from the fuel basket. By locking the supports to the fuel basket, the supports add structural integrity to the fuel basket and prevent the basket from warping and torquing due to repeated exposure to extreme temperature differentials.

U.S. Pat. No. 6,543,435, issued Apr. 8, 2003 to Regen, claims a collapsible multi-level barbeque grill, oven and smoker cooking system for outdoor cooking which has a body for enclosing items to be cooked, and one or both of a charcoal pan and a gas burner for providing heat for cooking. The system is characterized in that the body is formed of a plurality of ring segments of sequentially smaller size, arranged such that the body may be collapsed telescopically to form a cooking chamber of a first height, or extended from the collapsed state to form a cooking chamber of a second, substantially greater height.

U.S. Pat. No. 5,575,195, issued Nov. 19, 1996 to Foxford, concerns a collapsible portable outdoor cooking device having wall assemblies which are hinged and foldable and when erected form an enclosure. Hangers are detachably securable to the enclosure to support a cooking grill above the enclosure. The device may be used with gaseous fuels or may be positioned on a pan so wood or charcoal may be used as a fuel. The grill has handles which may be extended to assist the user in moving the grill.

U.S. Pat. No. 4,210,118, issued Jul. 1, 1980 to Davis, puts forth a portable collapsible barbecue cooking stove having scissor action support legs pivotally joined together and pivotably joined to a cooking and support surface by pivot pins and an over-center link arrangement so that in the erected position the cooking and support surface is in a horizontal position and is easily foldable by unlatching of a catch disconnecting the four bar linkage structure. The barbecue includes wheels for mobility.

U.S. Pat. No. 4,819,614, issued Apr. 11, 1989 to Hitch, describes a duel fuel barbecue grill assembly having a dual mode of operation for cooking with charcoal briquettes or with a burner element. The firebox of the grill includes a burner element near the floor thereof and an aperture in one of the sidewalls for receiving a tray member. The tray member has channels for receiving charcoal to be ignited by the gas burner and which, in its 180.degree. inverted position, acts as a shield for the burner. Positive locking is accomplished with spring-clips and by bimetallic lever arms which lock the tray in the tracks when heated.

U.S. Pat. No. 5,481,965, issued Jan. 9, 1996 to Kronman, indicates a rack and screen assembly for converting gas grills into charcoal and/or wood burning grills. The assembly is fabricated from high temperature stainless steel, so that the assembly, when heated to its cooking temperature, retains such elevated temperature for an extended period of time. The rack includes an open frame with runner legs at its lower end that sits atop the cylindrical tubes of conventional gas grilles. Braces extend transversely across the open frame to reinforce same, and ledges are defined at the upper ends of the open frame. The perforated metal screen is inserted into the upper end of the frame until the screen rests upon the ledges. When the screen is damaged, or wears out, the damaged screen is lifted out of the frame and replaced, manually, in a simple fashion and without resort to manual tools.

U.S. Pat. No. 6,557,545, issued May 6, 2003 to Williams, indicates an improved barbecue grill for outdoor cooking, having an upper cooking chamber portion; a lower fuel storage portion and a countertop member. The grill also provides a firebox with access doors and a grate for stoking a wood or charcoal fuel fire in a lower chamber. The upper cooking chamber portion is made up of a hollow cylindrical drum, having a planar rack portion supported horizontally therein. Drum has first and second end plates and a sidewall, with an opening downward in said drum sidewall. An arcuate door movably hinged is located on the upward side of said drum. The drum is horizontally positioned and supported upon said countertop member. Countertop member is supported on the lower fuel storage portion and includes an opening therethrough. The lower fuel storage portion is a vertical skirt portion, having an opening upwardly and a bottom plate. A pair of doors covers an aperture in the skirt portion for accessing the interior of said skirt portion. A fuel shelf and a sliding shelf portion for removal of ashes are located inside of the skirt portion.

U.S. Pat. No. 7,270,122, issued Sep. 18, 2007 to Jones, provides a portable cooking apparatus which provides both direct and indirect heat cooking and which cooks with the convenience of bottled or natural gas, and in accordance with one feature thereof, also provides flavor enhancements from wood or charcoal if desired. A multi-purpose cooking apparatus is provided which includes a housing including a direct heat cooking area on one side and an indirect heat cooking area on the other side adjacent to the direct heat cooking area. A burner or burners are disposed beneath the direct heat cooking area. A removable cooking pan, having an open bottom formed by spaced rods, is located, in use, above the burners and below the direct heat cooking area. A removable water pan is interchangeable with the cooking pan and is selectively positionable within the housing in a first position beneath the indirect heat cooking area wherein heated water evaporating from the pan moistens the food, and a second position beneath the direct heat cooking area when the cooking pan is removed, wherein the water pan can be used for steaming as well as boiling and frying.

U.S. Pat. No. 7,241,466, issued Jul. 10, 2007 to Dellinger, concerns a charcoal flap assembly for gas grills or add-on component for a gas grill that provides the additional functionality of permitting grilling with either gas, charcoal briquettes, or wood chips. The additional functionality of being able to cook with charcoal or wood chips on a gas grill is achieved by positioning moveable flaps in a second position thus providing a horizontal surface above the gas burner, yet below the cooking surface, upon which to place charcoal briquettes. Spaces on either side of each pair of flaps allow the gas burners to be used to ignite the charcoal briquettes or wood chips. Once the charcoal briquettes or wood chips are ignited, use of the gas burner is discontinued. The charcoal or wood chips are permitted to burn to complete ash, then the moveable flaps are placed to a first position thus forming an apex that permits the ash to fall into an ash pan located in the bottom of the firebox. Alternatively, if cooking with gas is preferred, the movable pairs of flaps can be positioned in the first position thus forming an apex arrangement over the gas burners to protect the burners from drippings.

U.S. Patent Application #20070028912, published Feb. 8, 2007 by Gagas, claims a modular portable gas grill including an energy management system for even temperature control, enhanced flavor devices, and electronic, electromechanical, or mechanical controls. The grill includes a touch control system including sliders or knobs providing efficient, precise and accurate control. Heat and flame deflecting shields provide an improved air draft, heat, and flavoring system and can be removed for cleaning Modular design construction and a quick-connect gas manifold permit the addition of additional components at a later date such as a rotisserie, and a smoke chute for flavoring. Burner shields protect the burner and flame from greases and liquids. The grill also features the ability to easily convert between propane and natural gas fuel and an electronic reigniting system providing individualized control to the burners. The grill also features a dual fuel mode giving a user the ability to use propane or natural gas along with charcoal or other solid fuel.

U.S. Patent Application #20040112226, published Jun. 17, 2004 by Johnston, describes a charcoal tray and grate lift system for gas barbecue grills. A gas barbecue grill is provided which includes a firebox assembly containing a gas burner element, a cooking grate supported thereabove, a top casting rotatably affixed thereto, the firebox assembly defining a receiving slot in a sidewall thereof, and a tray carrier assembly configured to be slidably received within the receiving slot of the firebox assembly, the tray carrier assembly being configured to support a charcoal tray. The gas barbecue grill further includes a grate frame configured to support the cooking grate, and a grate lift assembly configured to raise and lower the grate frame relative to the firebox assembly.

Two U.S. Pat. Nos., 4,706,643 issued Nov. 17, 1987 and 4,638,787 issued Jan. 27, 1987 to Tyson, disclose a grill of the type ordinarily associated with charcoal. A convertible improved charcoal ignition to gas grill means is provided which comprises: an ignition chamber having a bottom, a surrounding wall structure extending upwardly from said bottom, and an open top wherein said surrounding wall structure slopes inwardly from said bottom to said open top; a grill chamber having a surrounding wall structure, an open bottom and an open top wherein said surrounding wall structure slopes outwardly from said open bottom to said open top; a collar extending between said open top of said ignition chamber and said open bottom of said grill chamber for supporting said grill chamber above said ignition chamber and for providing means for air to flow between said ignition chamber and grill chamber; basket type means disposed within said grill chamber for receiving and containing briquettes directly above said open bottom; means for supporting said basket type means within said grill chamber; a generally horizontal grill disposed within said grill chamber above said basket type means; means for supporting said grill with said grill chamber; a smoke cover movable between an open and closed position for closing said open top of said grill chamber; and a removable gas burner means; a removable ash pan; said gas burner means and such ash pan alternately insertable into said collar whereby a convertible grilling means.

U.S. Pat. No. 5,032,183, issued Jul. 16, 1991 to Frazier, illustrates a gas grill briquette basket used to help reduce flame flare-up and unhealthy bacteria growth which can result from a build-up of grease drippings from meat onto briquettes. Briquette basket could be made of metal rods welded together forming a basket (cage) which surrounds the briquettes. After cooking session has ended and food has been removed from food rack, user removes food rack, raises briquette basket with ladles which attached to either end of briquette basket, rotates briquette basket 180 degrees around the horizontal axis with said handles and lower said basket back into position, and replaces food rack. Now the side of the briquette basket which received the meat and the grease drippings during the cooking session is facing the gas burner and the heat from the burner burns the meat and the grease drippings.

U.S. Pat. No. 3,824,984, issued Jul. 23, 1974 to Swanson, shows a device for converting a standard charcoal grill to a gas fired cooking apparatus. The burner comprises a series of rings which have upwardly facing apertures which are disposed concentrically about a central axis of a typical bowl shaped charcoal grill. Rigid members depend from the rings and rest upon the bottom of the grill (to support the burner generally parallel to the open top portion thereof). The rings are connected to a source of gas either through the side or over the side of the grill. In addition, a special grate fabricated from sheet metal for supplying a greater proportion of conductive heat to the food being cooked may be suspended above the grill.

U.S. Pat. No. 4,492,215, issued Jan. 8, 1985 to DiGianvittorio, describes an outdoor portable charcoal gas grill which includes a housing having a base for supporting a burner therein, a pair of spaced apart front and rear walls, a pair of spaced apart side walls, and a cover. Each wall in each pair of walls releasably interlocks with each associated wall of the other pair of walls. At least one of the walls is detachably mountable to the base. The cover is hingeably attachable to one of the walls when that wall is erected on the base and is hingeably attachable to the base when the walls are detached from the base to form a portable housing. A collapsible stand may also be provided for supporting the erected grill housing.

U.S. Pat. No. 4,553,524, issued Nov. 19, 1985 to Wheat, discloses a portable, compact, gas-fired cooking and barbecuing device for frying and boiling food in conventional cooking utensils, or barbecuing food when a barbecuing attachment is utilized. The device includes a bowl-shaped body having a bottom and a relatively deep, cylindrical side wall. A gas burner assembly is mounted in the bowl-shaped body so that the annular burner of the assembly is positioned toward the bottom of the body to protect it from wind effects. Three circumferentially spaced, radially extending support members connect the burner to the cylindrical side wall of the bowl and serve as supports for cooking utensils in which food is to be fried or boiled. Mounting portions on the other ends of the support members extend above the upper edge of the body for supporting large sized cooking utensils. When the lower cylindrical portion of an annular barbecuing attachment is engaged with the support members of the burner assembly, food items may be barbecued on the barbecuing grill of the attachment. The diameter of the upper portion of the attachment is larger than the side wall of the bowl-shaped body to prevent food drippings from falling onto the bowl side wall.

Two U.S. Pat. Nos., 4,777,927 issued Oct. 18, 1988 and 4,966,125 issued Oct. 30, 1990 to Stephen, indicate a barbeque kettle which includes a bowl and a cover with the bowl having a food support grid adjacent an upper rim and a charcoal grid below the food grid along with a cover holder adjacent the rim of the bowl. The cover has a removable thermometer that can sense the initial temperature of the kettle and can also be used as a food thermometer. A pair of charcoal baskets are positionable on the charcoal grid for direct or indirect cooking.

U.S. Pat. No. 6,000,389, issued Dec. 14, 1999 to Alpert, is for a combination gas and charcoal grill that includes a housing, a heat distribution element, a gas burner, and an ash pan drawer. The heat distribution element is disposed in the housing for supporting one of lava rocks and ceramic briquettes when the combination gas and charcoal grill is being used as a gas grill and for supporting charcoal briquettes when the combination gas and charcoal grill is being used as a charcoal grill. The gas burner is disposed in the housing for heating the one of the lava rocks and the ceramic briquettes when the combination gas and charcoal grill is being used as the gas grill and for initially igniting the charcoal briquettes when the combination gas and charcoal grill is being used as the charcoal grill. The ash pan drawer is replaceably mounted in the housing and is removed for heating the one of the lava rocks and the ceramic briquettes and for initially igniting the charcoal briquettes and being returned after charcoal ignition for collecting ashes generated by the charcoal briquettes and food drippings when the combination gas and charcoal grill is being used as the charcoal grill. The combination grill further providing the ease of front-panel loading of lava rocks or charcoal and the venting of heat generated by such heating medium.

U.S. Pat. No. 5,878,739, issued Mar. 9, 1999 to Guidry, provides a combined gas and charcoal grill having an adjustable height burner. A combined gas and charcoal grill are provided in which the burner element is pivotably mounted within the grill enclosure so as to permit location adjustment of the burner relative to the grid which supports the food to be cooked. The burner element is configured along with a charcoal tray to form a burner/tray assembly which is vertically movable. Flame height from the burner is also adjustable independent of burner location. A deflector shield is provided to prevent grease and food debris from coming into contact with the burner itself. A removable tray also permits the use of water for steaming and wood chips for smoking. A self-cleaning feature is also provided.

U.S. Pat. No. 3,692,013, issued Sep. 19, 1972 to Grafton, illustrates a portable gas-fired cooking grill includes a receptacle having an open top and a cover swingably mounted on the receptacle to form a closed housing when the cover is swung to its closed position, the cover being swingable to an open horizontal position wherein the open bottom of the cover faces upwardly alongside the open top of the receptacle. Removable stand means are provided for supporting both the receptacle and the cover in their open condition above a supporting surface. A pair of grills are respectively removably mounted over the open top of the receptacle and the opening in the cover. A gas burner is disposed in the bottom of the receptacle and is supplied with gas from a removable propane tank, which is storable in the cover. A plurality of ceramic briquettes are releasably clamped in a predetermined pattern in the receptacle above the gas burner.

U.S. Pat. No. 5,318,322, issued Jun. 7, 1994 to Horne, describes a cart for barbecue grills. The cart has a shelf, a table, two first legs and two second legs. The shelf has two parallel beams for carrying a barbecue grill. The beams each have a first end, a second end and a curved slot formed therein near the second end thereof. A pivot joins together the first ends of the supports. A bar joins together the second ends of the supports. The table has two supports pivotally attached to the beams and a number of slats transversely attached on the supports. The first legs each have a first end, a second end and a linking point sited between the first and second ends thereof. The first ends of the first legs are pivotally attached to the first ends of the supports by the pivot. The second ends of the first legs are joined together by a handle. The second legs each have a first end, a second end and a linking point sited between the first and second ends thereof. The first legs are pivotally linked to the second legs at the linking points thereof. The first ends of the second legs are joined together by a rod receivable in the curved slots so that the cart is in an extended position. The second ends of the second legs carry two wheels for rolling when the cart in a folded position. A hook is attached on the rod for hooking a grip formed on a gas tank. A slat is attached on the first legs and has two cutouts for receiving a cylindrical stand formed below the gas tank.

U.S. Pat. No. 6,422,230, issued Jul. 23, 2002 to Stewart, claims a foldable or collapsible stand for supporting a barbecue grill assembly. The foldable or collapsible stand includes a first leg assembly having a first pair of intersecting leg members pivotally mounted to each other and a second leg assembly having a second pair of intersecting leg members pivotally mounted to each other. At least one leg member of each of the first pair and second pair of intersecting leg members have a pivot point along a length of the at least one leg member for folding the at least one leg member. The first pair of intersecting leg members and second pair of intersecting leg members pivot with respect to each other and the at least one leg member of each of the first pair and second pair of intersecting leg members fold along the pivot point to move the first leg assembly, the second leg assembly and barbecue grill between an upright position and a collapsed position.

What is needed is a combination gas and charcoal grill with a multi-positional stand and lockable top on the gas grill pivotally mounted on the stand and an insertable charcoal grill which stores and transports inside the gas grill.

BRIEF SUMMARY OF THE INVENTION

An object of the present invention is to provide a combination gas and removable charcoal grill with a multi-positional stand and lockable top on the gas grill pivotally mounted on the stand and an insertable charcoal grill which stores and transports inside the gas grill.

In brief, the present invention provides a portable combination gas and charcoal barbecue grill comprising a gas grill and a removable charcoal tray, the gas grill being pivotally attached at one end to a folding stand. The folding stand comprises a first U-shaped stand portion of which the bent cross bar of the U-shape serves as a handle and which has at least one caster or wheel at the end of each of the legs thereof, a first support leg pivotally attached to a mid-portion of a first leg of the U-shaped stand portion, a second support leg pivotally attached to a mid-portion of a second leg of the U-shaped stand portion. A crossbar connects the first and second support legs so that first and second support legs may be folded or extended as a unit. A fuel tank support shelf is mounted on the crossbar. At least one wheel is attached to the end of the first support leg and at least one wheel is attached to the end of the second leg. A secondary support brace is pivotally attached to and extends from a midpoint on the opposing side of the U-shaped stand portion from where the first and second support legs extend. When the barbecue grill and stand are in a collapsed position the grill may be transported on the wheels by being pulled by the handle.

An advantage of having a two-in-one grilling ability is that some times one may not have time to start a fire with charcoal and wait until the coil is ready for use, but with the option of gas built into the unit it is only necessary to ignite the gas to use the unit to cook immediately.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
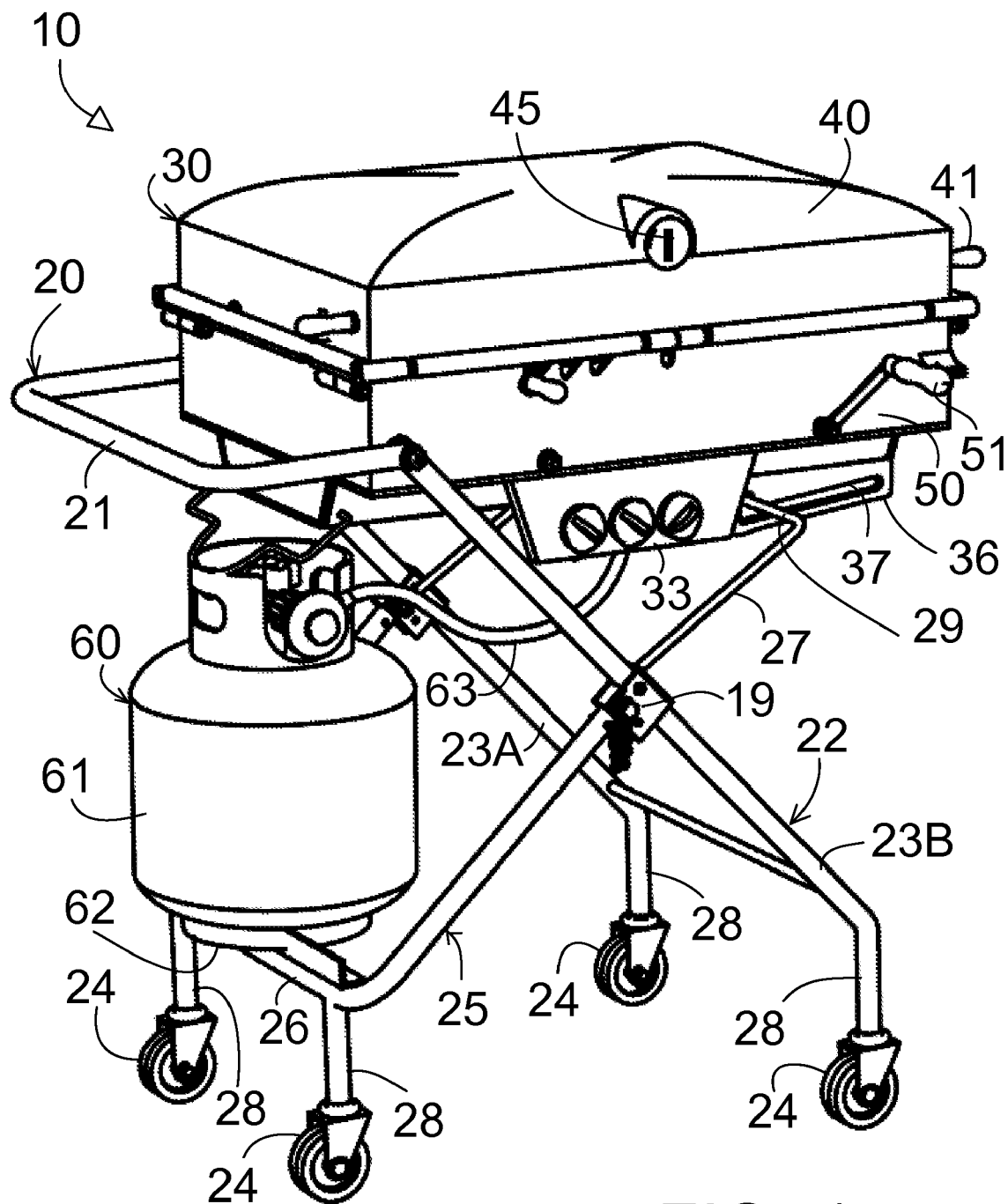
FIG. 1 is a perspective view of the combination gas and charcoal grill of the present invention resting on the grill stand with the cover closed and the grill in a horizontal position ready for use.
Figure 2:
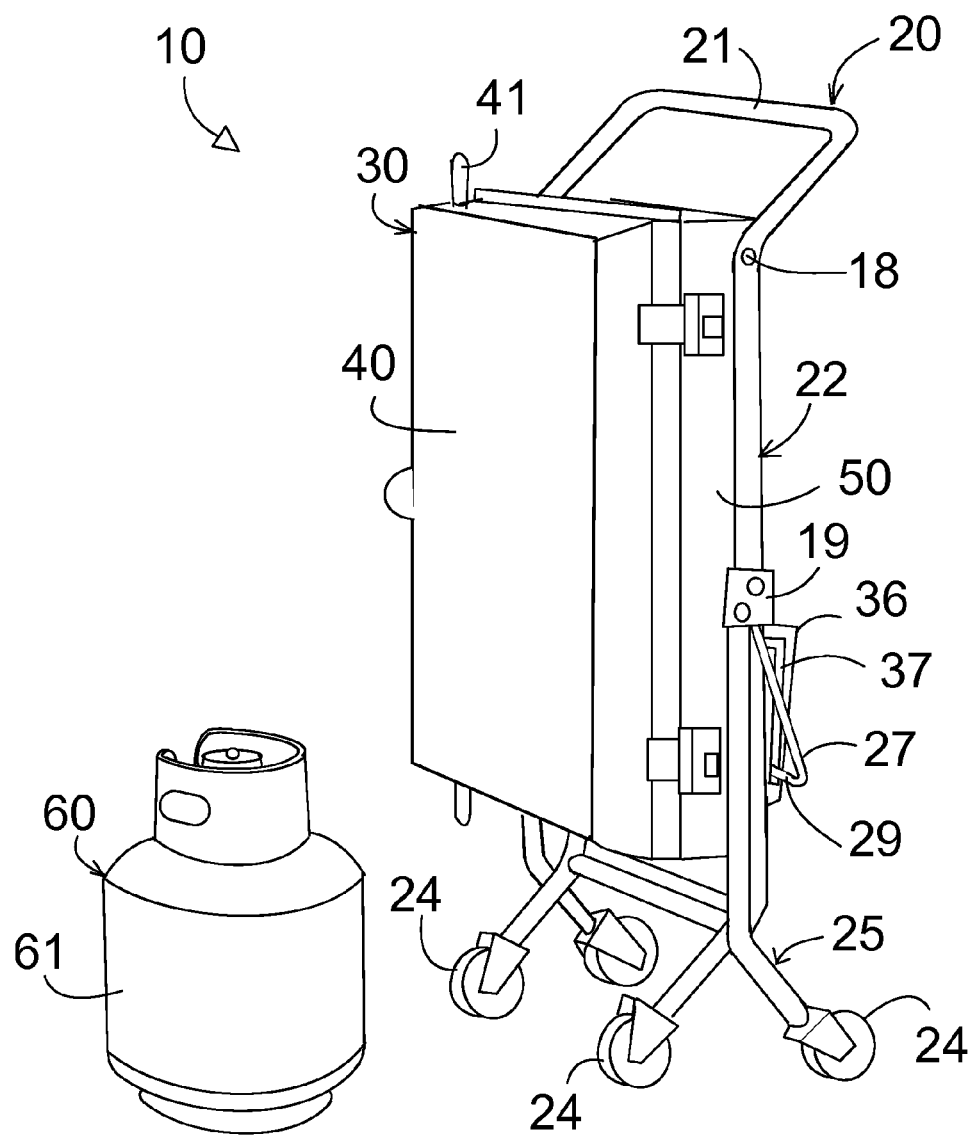
FIG. 2 is a perspective view of the combination gas and charcoal grill of FIG. 1 pivoted down onto the grill stand which is pivoted with the legs in vertical parallel alignment with the grill in a parallel vertical position for transporting and storage.
Figure 3:
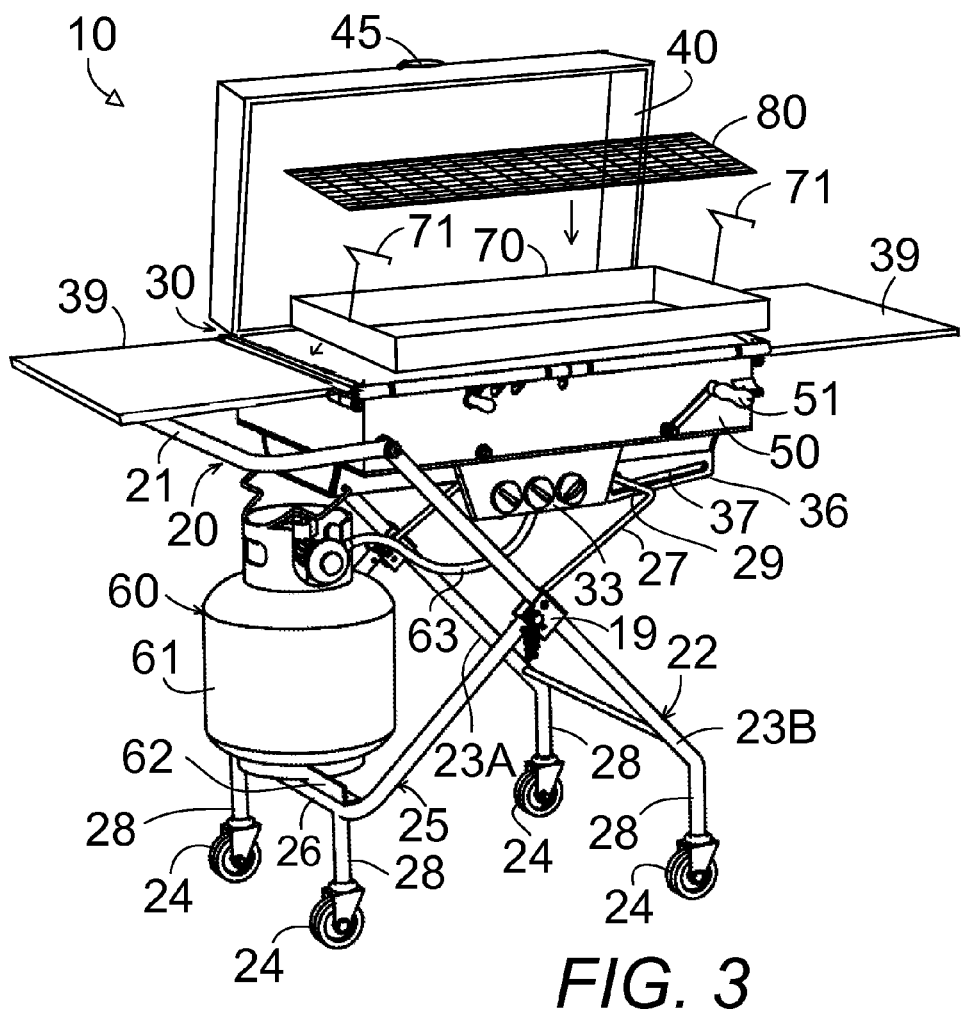
FIG. 3 is a perspective view of the combination gas and charcoal grill of FIG. 1 resting on the grill stand with the cover open and the grill in a horizontal position ready for use showing a charcoal tray aligned for insertion in the base of the gas grill and the food support grate aligned for placement over the charcoal tray.

In FIGS. 1-3, a combined gas and charcoal portable grill device 10 comprises a combination of a gas grill 30 pivotally mounted to a fold-up grill stand 20 and an insertable and removable charcoal grilling tray 70.

The gas grill 30 comprises a base 50 and a cover 40 pivotally attached to the base including cover handles 41 and a cover lock 45. The base houses at least one gas cooking jet, gas tubes 63 through the base for feeding gas to the at least one gas cooking jet, and means for ventilating the base during cooking operations.

The charcoal grilling tray 70 with tray handles 71 is removably mounted in the base 50 above and spaced apart from the at least one gas cooking jet of the gas grill when the gas grill is turned off to alternately cook using charcoal with the charcoal grilling tray 70.

A food supporting grill 80, shown in FIG. 3, is alternately mounted over the at least one gas cooking jet and the charcoal grilling tray 70 for supporting food being grilled.

The grill stand 20 is pivotally attached to the base 50 of the gas grill. The grill stand 20 comprising a first U-shaped stand portion 22 having two first parallel legs 23A and 23B and a first end cross bar 21 between the legs, the first cross bar 21 serving as a handle for the grill stand. It further comprises at least one means, such as a wheel or caster 24 for rolling the stand at the end of each of the first legs thereof. The base 50 of the gas grill 30 is positioned between the two first parallel legs 23A and 23B adjacent to and spaced apart from the first end cross bar 21 with a first end of the base 50 pivotally attached, such as by a pivot pin 18, to each of the two first parallel legs 23A and 23B.

A second U-shaped stand portion 27 has two second parallel legs and a second end cross bar 29 between the second legs, the ends of the second support legs pivotally attached to a mid-portion pivot 19 of the first U-shaped stand portion. The second U-shaped stand portion 27 is positioned between the first U-shaped stand 22 and the base 50 of the gas grill 30.

A third U-shaped stand portion 25 has two third parallel legs and a third end cross bar 26 between the second legs. The third end cross bar 26 has a means, such as a bracket 62 to support a gas tank assembly 60 thereon. The ends of the third support legs pivotally attached to a mid-portion pivot 19 of the first U-shaped stand portion 22 with the third end cross bar 26 extending downwardly therefrom. At least one means for rolling the stand, such as a castor 24 and castor support arm 28, extends downwardly at each outer end of the third end cross bar 26.

A structure 36 extends downwardly from each of two side edges of a second end of the base 50 of the gas grill 30. Each of the structures 36 having a mating L-shaped slot 27 therein with a long leg of the L positioned substantially parallel to a bottom of the base 50 of the gas grill 30 spaced apart from the base of the gas grill and a short leg of the L extending upwardly from the long leg. The second end cross bar 29 extends across the second end of the base between the structures with the second end cross bar 29 resting slidably within the L-shaped slot 27 on each side so that locking the second end cross bar in the short leg of the L, as in FIGS. 1 and 3, and the first U-shaped stand portion 22 and third U-shaped stand portion 25 pivoted apart on a lower end, the second U-shaped stand portion 27 supports the base 50 of the gas grill 30 in a horizontal position. Releasing the second end cross bar 27 so that it slides within the long leg of the L allows the base 50 of the gas grill 30 to pivot down parallel to the first U-shaped stand portion 22 for transport vertically with the first U-shaped stand portion 22 and third U-shaped stand portion 25 pivoted together, as shown in FIG. 2.

The charcoal grilling tray 70 is stored inside the gas grill 30 with the cover 40 closed for transportation and storage.

A means for raising and lowering the food supporting grill 80, such as a lever structure controlled by a handle 51 is removably attached to the base 50 of the gas grill 30.

The cover 40 and base 50 of the gas grill 30 are preferably made of an aluminum alloy. The food support grill 80 is preferably made of stainless steel rods. The adjusting unit with the handle 51 is preferably made of cold roll steel. The grill stand 20 is preferably made of one inch diameter 16 gage cold roll steel with 4 (four) 4" inch wheels at the base: two of the wheels are fixed and the others are casters for moving the grill from one place to another easier.

In use, the first U-shaped stand portion 22 and the third U-shaped stand portion 25 are spread apart and the second end of the base 50 of the gas grill 30 is elevated to place the base 30 in a horizontal position and the cross bar 29 of the second U-shaped stand portion 27 is locked into the vertical small leg of the L slot 37 to lock the base 50 in place. The cover 40 is lifted and two side trays 39 pivot out from the base 50 of the gas grill 30 for holding food and cooking utensils. Then either the charcoal tray 70 is used for cooking with the food positioned on the food support grill 80 or the gas jets are used for cooking with the charcoal tray 70 removed and the food support grill 80 positioned over the gas jets.

It is understood that the preceding description is given merely by way of illustration and not in limitation of the invention and that various modifications may be made thereto without departing from the spirit of the invention as claimed.

What is claimed is:

1. A combined gas and charcoal portable grill device comprising in combination:

a gas grill comprising a base and a cover pivotally attached to the base, the base housing at least one gas cooking jet, gas tubes through the base for feeding gas to the at least one gas cooking jet;

a charcoal grilling tray removably mounted in the base above and spaced apart from the at least one gas cooking jet of the gas grill when the gas grill is turned off to alternately cook using charcoal with the charcoal grilling tray;

a food supporting grill alternately mounted over the at least one gas cooking jet and the charcoal grilling tray for supporting food being grilled;

at least one side tray foldable into the base;

a grill stand pivotally attached to the base of the gas grill, the grill stand comprising a first U-shaped stand portion having two first parallel legs and a first end cross bar between the legs, the first cross bar serving as a handle for the grill stand and further comprising at least one means for rolling the stand at the end of each of the first legs thereof, the base of the gas grill positioned between the two first parallel legs adjacent to and spaced apart from the first end cross bar, a first end of the base of the gas grill pivotally attached to each of the two first parallel legs; a second U-shaped stand portion having two second parallel legs and a second end cross bar between the second legs, the ends of the second support legs pivotally attached to a mid-portion of the first U-shaped stand portion, the second U-shaped stand portion positioned between the first U-shaped stand and the base of the gas grill; a third U-shaped stand portion having two third parallel legs and a third end cross bar between the second legs, the third end cross bar having a means to support a gas tank thereon, the ends of the third support legs pivotally attached to a mid-portion of the first U-shaped stand portion with the third end cross bar extending downwardly therefrom, and further comprising at least one means for rolling the stand extending downwardly at each outer end of the third end cross bar;

a structure extending downwardly from each of two side edges of a second end of the base of the gas grill, each of the structures having an L-shaped slot therein with a long leg of the L positioned substantially parallel to a bottom of the base of the gas grill spaced apart from the base of the gas grill and a short leg of the L extending upwardly from the long leg, the second end cross bar extending across the second end of the base between the structures with the second end cross bar resting slidably within the L-shaped slot on each side so that locking the second end cross bar in the short leg of the L and the first and third U-shaped stand portion pivoted apart on a lower end, the second U-shaped stand portion supports the base of the gas grill in a horizontal position and releasing the second end cross bar so that it slides within the long leg of the L allows the base of the gas grill to pivot down parallel to the first U-shaped stand portion for transport vertically with the first U-shaped stand portion and third U-shaped stand portion pivoted together.

2. The device of claim 1 wherein the charcoal grilling tray is stored inside the gas grill for transportation and storage.

3. The device of claim 1 wherein the means for rolling the grill stand comprises at least two casters at one end of the grill stand.

4. The device of claim 1 further comprising means for raising and lowering the food supporting grill removably attached to the base of the gas grill.

* * * * *